Dec. 20, 1960   H. C. F. DE JONG   2,964,947
THERMOMETER
Filed Sept. 8, 1958
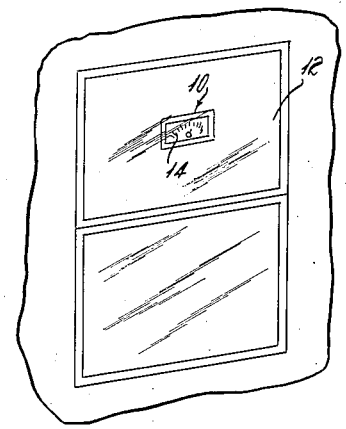
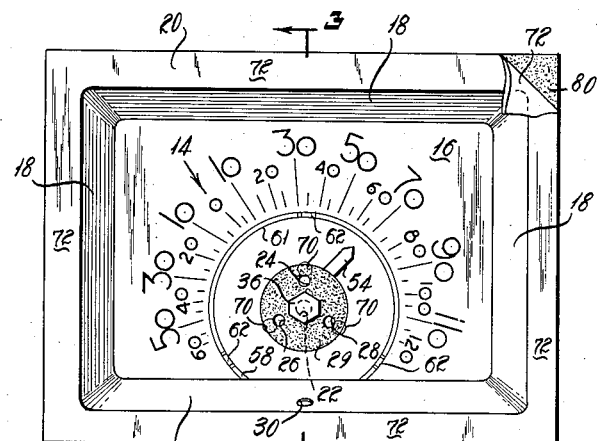
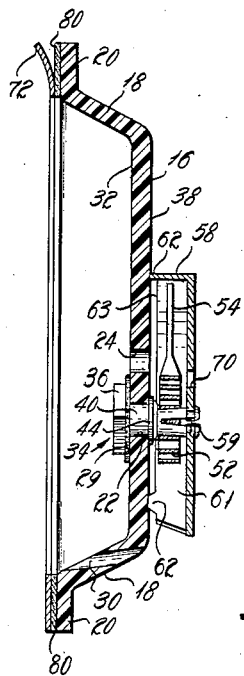
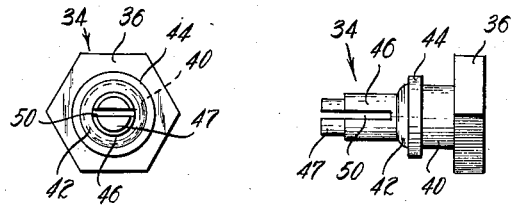
INVENTOR
HENRY C. F. DE JONG
BY *Strauch, Nolan & Neale*
ATTORNEYS

United States Patent Office 2,964,947
Patented Dec. 20, 1960

2,964,947
THERMOMETER

Henry C. F. De Jong, Springfield, Ohio, assignor to Springfield Greene Industries Inc., a corporation of Ohio Filed Sept. 8, 1958, Ser. No. 759,633
6 Claims. (Cl. 73—363.7)

This invention relates to thermometers and more particularly to a thermometer adapted to be mounted on the outside of the windowpane so that the outside temperature can be readily visible through the windowpane to persons inside an enclosure.

There has long been a need for an inexpensive thermometer registering outside temperature which can be easily read from the inside of a house or closed vehicle. Prior thermometers adapted for this purpose include remote reading thermometers of the type having a fluid bulb outside and a scale inside connected by capillary tubing through a wall of the enclosure and of the type having a temperature sensitive electrical resistance element outside connected to a suitable indicating device by wires extending through the wall of the enclosure to the temperature indicating device inside. In still other types of installations, special mounting brackets for supporting a thermometer at a position adjacent a window to be visible inside of the enclosure have been used.

In U.S. Patent No. 2,803,137 to Bradley, a thermometer is provided which is adapted to be secured to the outside of a windowpane by a flat tape which overlaps a tapered peripheral edge of the thermometer and part of the windowpane. In this prior thermometer, the temperature sensitive element is on the outside of the thermometer housing and the pointer and scale on the inside of the thermometer housing thereby requiring a low friction bearing surface for the pointer shaft and a protective casing for the temperature sensitive element on the outside of the thermometer housing.

It is an object of the present invention to provide a novel and inexpensive thermometer having a tacky adhesive applied to a peripheral edge surface adapted to support the thermometer on the windowpane to be mounted directly on the outer surface of the windowpane to be readily visible through the windowpane.

Another object of this invention is to provide a thermometer housing formed of a transparent plastic material which carries a temperature sensitive bimetal and pointer at a position located inside the space between the thermometer housing and an outer casing to be fully protected against mechanical damage thereby obviating the need for a low friction bearing for a pointer shaft.

A further object of this invention is to provide in a windowpane thermometer of the foregoing type an apertured housing to assure adequate air circulation around the temperature sensitive element, an opaque coating covering the temperature sensitive element to prevent response to direct radiation through the windowpane, and a further aperture to provide for drainage of condensation or moisture which accumulates between the outside of the windowpane and the inside of the thermometer housing.

These and further objects of the invention will be more fully apparent from the claims, and from the description as it proceeds in connection with the drawings wherein:

Figure 1 is a view showing the thermometer mounted on the outside of the pane of a window;

Figure 2 is a front elevation view of the thermometer constructed in accordance with the present invention;

Figure 3 is a side elevational view in section taken along lines 3—3 of Figure 2;

Figure 4 is a rear elevation view of the bimetal arbor after deformation subsequent to being assembled with the transparent plastic housing material, but before the outer cover is secured in position; and Figure 5 is a side elevation of the arbor of Figure 4.

Referring now to the drawings, the thermometer 10 is adapted to be mounted at a suitable position on a windowpane 12 so that the indicia 14 are visible through windowpane 12. As best shown in Figures 2 and 3, thermometer 10 has a housing formed of a plastic material such as butyrate to have a flat rectangular base 16 with integral, forwardly extending side edges 18 surrounding the flat base 16 and terminating in a peripheral flange 20 which is parallel to base 16. The butyrate material, while preferably transparent may be tinted or colored as desired, and molded to have a substantially uniform thickness throughout as illustrated in Figure 3. Base 16 is provided with a first aperture 22 and three smaller apertures 24, 26 and 28 which are, as shown in Figure 2, equidistant from and symmetrically disposed about the first aperture 22. A further aperture 30 is provided in the lower forwardly extending section 18 immediately adjacent flange 20. Temperature indicia (index marks) 14 are printed on the inside surface 32 of base 16 to be readily visible through windowpane 12 and to be protected against weather. As shown in Figure 2, the index marks are disposed radially about the center of the first aperture 22. An opaque coating 29 is preferably provided around apertures 22, 24, 26 and 28 as illustrated in Figure 2 and made of the same material as index marks 14.

Mounted in aperture 22 of base 16 is a fixed arbor 34 shown in detail in Figures 4 and 5. Arbor 34 comprises an enlarged head 36 which is adapted to abut against inside surface 32 of base 16. Adjacent head 36 is a first shank 40 which has a diameter substantially equal to the diameter of aperture 22. Shank 40 extends axially a distance slightly greater than the thickness of base 16 and is made of soft brass so that upon assembly, shoulder 42 is pressed toward head 36 to provide an annular flange 44. Arbor 34 is secured in position on base 16 by the force between the adjacent surfaces on flange 44 and head 36.

Arbor 34 is provided with a second shank 46 of reduced diameter and also a third shank 47 of still smaller diameter. A diametral slot 50 is cut through shanks 46 and 47 to support the inner end of a conventional bimetal spiral 52 in a position as shown in Figure 3 with pointer 54 cooperating with index marks 14 to provide an indication of temperature.

After the thermometer has been assembled a protective cover 58, preferably of a metal such as aluminum which is generally flat and is provided with a cylindrically shaped side wall 61 having three spaced legs 62 which abut against rear surface 38 of base 16 to space edge 63 of side wall 61 from rear surface 38, is secured against shank 46 as by means of peening over the extended part of shank 47 which extends beyond the back surface of cover 58. The diameter of hole 59 is slightly smaller than the diameter of shank 46 so that cover 58 fits only over shank 47, and the peening operation provides a deformed end on shank 47 which rigidly secures cover 58 to base 16.

The several apertures 24, 26 and 28 in housing base 16, which are in substantial alignment with corresponding apertures 70 in cover 58, are immediately adjacent bimetal spiral 52 to provide good air circulation from the outside of the thermometer to the space around bimetal spiral 52. In installations where the air circulation is poor, more apertures may be provided so that the region adjacent the bimetal spiral 52 is more or less perforated. With a sufficient number of apertures for good circulation of air around bimetal spiral 52, the effect of the inside temperature of the house on the bimetal coil through the windowpane has been found to be negligible. Even direct radiation through the windowpane is substantially negligible because of the shielding effect provided by opaque coating 29 which is slightly larger in diameter than the outer spiral of bimetal 52.

To secure thermometer 10 to the windowpane, there is provided a layer 72 of a suitable tacky adhesive substance such as is provided by a pressure sensitive adhesive tape on the forward surface of flange 20 around part at least of the periphery of the thermometer. The pressure sensitive adhesive conventionally is supplied on a layer 72 of a suitable paper which when removed exposes the adhesive layer 80. The layer 72 of paper is permitted to remain on flange 20 to prevent the adhesive from drying so that it retains its sticky characteristic for an appreciable period of time. After the thermometer is purchased and ready for installation, paper layer 72 is removed and the thermometer pressed into position on the windowpane with the adhesive layer 80 serving to hold flange 20 securely to the windowpane.

The thermometer of the present invention is also adapted for use on automobiles. The thermometer housing may be secured to a fixed windowpane on the automobile with flange 20 suitably contoured to match the surface of the fixed glass panel. The sloping side edges 18 reduce the wind resistance when thermometer 10 is mounted on the outside window of an automobile and with the use of a generally transparent or slightly tinted plastic, the impairment of vision is very small.

The diameter of all air circulation apertures is preferably $\frac{1}{16}$ inch and no greater than $\frac{1}{8}$ inch so that dirt and other foreign objects inside the space between the windowpane and the thermometer housing are kept to a minimum.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A thermometer for mounting on the outside of a transparent windowpane comprising a body of a plastic material of substantially uniform thickness throughout having a flat base marked with indicia of temperature, forwardly extending side edges integral with and surrounding said base and terminating in an integral peripheral flange having a flat surface parallel to said flat base, a coating of pressure sensitive adhesive on the flat surface of at least part of said peripheral flange for securing said thermometer to said windowpane, said coating being covered with a layer of protective material adapted to be removed to expose said adhesive coating for mounting the thermometer on the windowpane, an arbor carrying a temperature sensitive bimetal element having a pointer cooperating with said temperature indicia, said arbor being mounted to extend through said flat base, said arbor having an enlarged head on one end abutted against the forward side of said flat base closest to said peripheral flange, a first shank portion adjacent said enlarged head extending through said flat base and deformed to be secured to said base, a second shank portion extending outwardly from said first shank portion having a diametral cut in which a fixed end of said bimetal element is mounted, an apertured metal cover on the rearward side of said flat base for enclosing said bimetal element, and means for rigidly securing said metal cover to said arbor.

2. The thermometer defined in claim 1 wherein said arbor contains a third shank portion on the end thereof opposite said enlarged head and said cover contains an aperture aligned with said arbor having a diameter slightly larger than the diameter of said third shank portion and slightly smaller than the diameter of said second shank portion.

3. A thermometer for mounting on the outside of a transparent windowpane comprising a body of a plastic material having a flat base marked with indicia of temperature, forwardly extending side edges integral with and surrounding said base and terminating in an integral peripheral flange having a flat surface parallel to said flat base, a coating of pressure sensitive adhesive on the flat surface of at least part of said peripheral flange for securing said thermometer to said windowpane covered with a layer of protective material adapted to be removed to expose said adhesive coating for mounting the thermometer on the windowpane, a first aperture in said base, an arbor extending through said aperture carrying a temperature sensitive bimetal element having an integral pointer cooperating with said temperature indicia, said arbor being mounted to extend through said flat base, said arbor having an enlarged head on one end abutted against the forward side of said flat base closest to said peripheral flange, a first shank portion adjacent said enlarged head extending through said flat base and deformed so that the arbor is secured to said base, a second shank portion extending outwardly from said first shank portion having a diametral cut for receiving a fixed end of said bimetal element, a metal cover on the rearward side of said flat base, a plurality of additional apertures in said cover and in said base adjacent said first aperture to admit air through said cover and said base adjacent said bimetal element, the diameter of said apertures being less than $\frac{1}{8}$ inch, and means for rigidly securing said metal cover to said arbor.

4. A thermometer for mounting on the outside of a windowpane comprising a housing of a substantially transparent plastic material having a windowpane engaging surface extending around the periphery thereof with a central portion offset from said window engaging surface and provided with indicia of temperature; an arbor secured to the central portion of said housing and extending from said central portion away from the windowpane; casing means secured to one end of said arbor, said casing means having spaced leg portions abutting against said plastic material with air circulation passages between said leg portions; a bimetal spiral having one end secured to said arbor in the space between said central portion and said casing means and a pointer at the other end thereof cooperating with said indicia; a plurality of apertures in said casing means and in said housing adjacent said arbor to freely permit air circulation around said bimetal spiral; and adhesive means on said window engaging surface to secure said thermometer to said windowpane.

5. The thermometer as defined in claim 4 wherein the diameter of said apertures is between $\frac{1}{16}$ and $\frac{1}{8}$ inch.

6. The thermometer as defined in claim 4 having an opaque coating on said central portion surrounding said arbor of sufficient area to cover said spiral and prevent direct radiation through said windowpane from reaching said bimetal spiral.

References Cited in the file of this patent

UNITED STATES PATENTS

| 949,825 | Hedin | Feb. 22, 1910 |
| 1,348,210 | Cole | Aug. 3, 1920 |
| 1,672,388 | McWilliam | June 5, 1928 |
| 1,692,551 | Harris | Nov. 20, 1928 |
| 2,638,785 | Vacanti et al. | May 19, 1953 |
| 2,803,137 | Bradley | Aug. 20, 1957 |
| 2,839,924 | Pauli | June 24, 1958 |